United States Patent [19]

Arai et al.

[11] Patent Number: 5,096,496

[45] Date of Patent: Mar. 17, 1992

[54] PRIMER COMPOSITION AND METHOD FOR PRIMING SUBSTRATE SURFACE FOR ADHESION

[75] Inventors: Masatoshi Arai; Yoshifumi Inoue; Keisuke Imai, all of Gunma, Japan

[73] Assignee: Shin-Etsu Chemical Co., Ltd., Tokyo, Japan

[21] Appl. No.: 634,997

[22] Filed: Dec. 27, 1990

[30] Foreign Application Priority Data

Dec. 28, 1989 [JP] Japan .................................. 1-343434

[51] Int. Cl.$^5$ .......................................... C07C 279/00
[52] U.S. Cl. .................. 106/287.11; 156/329
[58] Field of Search ............... 106/287.11; 156/329

[56] References Cited

U.S. PATENT DOCUMENTS

4,734,479  3/1988  Inoue et al. ........................... 528/18

OTHER PUBLICATIONS

CA 108/16):133193k, Inoue et al, 1987.

*Primary Examiner*—Theodore Morris
*Assistant Examiner*—David M. Brunsman
*Attorney, Agent, or Firm*—Millen, White & Zelano

[57] ABSTRACT

A primer composition is proposed which is capable of greatly improving the adhesive bonding between a substrate surface, in particular, coated with a paint containing a fluorocarbon resin, urethane resin or acrylic resin as the vehicle, and a room temperature-curable silicon rubber composition, in particular, of the type curable by the condensation reaction. The primer composition is a homogeneous solution obtained by dissolving, in an organic solvent, a guanidino group-containing organosilicon compound, such as 3-(tetramethylguanidino)-propyl trimethoxy silane, and a so-called silane coupling agent, such as 3-mercaptopropyl trimethoxy silane, in a specified proportion.

4 Claims, No Drawings

PRIMER COMPOSITION AND METHOD FOR PRIMING SUBSTRATE SURFACE FOR ADHESION

BACKGROUND OF THE INVENTION

The present invention relates to a primer composition or, more particularly, to a primer composition and a method for improving the adhesive bonding between a condensation-type room temperature-curable silicone rubber composition and the surface of a substrate such as a paint-coated metal body.

It is conventional in the modern building works that the outer walls of a building are finished by using various kinds of metallic materials coated on the surface with a paint or coating composition containing fluorocarbon resins, urethane resins, acrylic resins and the like as the vehicle in order to be imparted with improved weatherability, attractive appearance and other desirable properties. It is also conventional in the building works that a room temperature-curable silicone rubber composition of the condensation-curable type is used as a sealing material for impregnating and preventing water leakage through joints and interstices formed in the outer walls of a building constructed by using paint-coated metallic materials.

It is essential in the above mentioned application of a room temperature-curable silicone rubber composition that strong adhesive bonding is obtained between the cured silicone rubber and the paint-coated surface of the wall materials while this is not always an easy matter so that troubles of water leakage are some-times caused at the joints due to incomplete adhesive bonding between the sealing material and the paint-coated surface. This problem of incomplete adhesive bonding can be at least partly solved by the pre-treatment of the paint-coated substrate surface with a primer composition prior to contacting with the room temperature-curable silicone rubber composition. Various types of primer compositions have been proposed and are used for the purpose, of which those containing a hydrolyzable organosilane compound or a hydrolysis-condensation product thereof as the principal ingredient are widely used. None of these prior art primer compositions, however, can be satisfactory due to the incompleteness of the priming effect obtained therewith.

SUMMARY OF THE INVENTION

The present invention accordingly has an object to provide a novel and very effective primer composition and a method for improving adhesive bonding between a room temperature-curable silicone rubber composition of the condensation-curable type and the surface of a substrate such as a paint-coated metal body.

Thus, the primer composition of the present invention comprises, as a homogeneous solution:

(a) an organic solvent;
(b) an organosilicon compound having, in a molecule, at least one guanidino group represented by the general formula $(R_2N)_2C=N-$, in which R denotes a hydrogen atom or a monovalent hydrocarbon group, such as 3-(tetramethylguanidino)propyl trimethoxy silane, or a partial hydrolysis product thereof dissolved in the organic solvent; and (c) a silane coupling agent, such as 3-aminopropyl trimethoxy silane, dissolved in the organic solvent in an amount in the range from 10 to 20,000% by weight based on the amount of the component (b).

The method of the present invention for priming the surface of a substrate for adhesive bonding accordingly comprises the steps of: coating the surface with the primer composition defined above in a suitable coating amount; and evaporating the organic solvent to dryness.

DETAILED DESCRIPTION OF THE PREFERRED EMBODIMENTS

As is described above, the primer composition of the invention is characterized by comprising a specific guanidino group-containing organosilane compound and a so-called silane coupling agent as the principal ingredients dissolved in an organic solvent to form a homogeneous solution. By virtue of this unique combination of the essential ingredients, the primer composition exhibits a remarkable effect of improving the adhesive bonding between the surface of various kinds of substrates including paint-coated metallic bodies and a silicone rubber formed thereon by curing a room temperature-curable silicone rubber composition of the condensation-curable type. The room temperature-curable silicone rubber composition for which the inventive primer composition is employed should be of the condensation-curable type known in the art of silicones. The condensation reaction by which the silicone rubber composition is cured includes several different types depending on the combination of the functional groups pertaining to the condensation reaction producing condensation products which may be water by the dehydration condensation, an alcohol by the dealcoholation condensation, molecular hydrogen by the dehydrogenation condensation, an oxime by the deoximation condensation, an amine by the deamination condensation, acetic acid by the decarboxylation condensation, a ketone by the deketonation condensation and the like. The inventive primer composition is effective for any of these condensation-type room temperature-curable silicone rubber compositions.

The component (a) in the inventive primer composition is an organic solvent which is not particularly limitative provided that the solvent has a sufficient dissolving power for the components (a) and (b) and has adequate vaporizability in view of the convenience in the coating works with the composition and subsequent drying in the inventive method for surface priming. Examples of suitable organic solvents include acetone, hexane, ligroin, isopropyl alcohol and the like though not particularly limitative thereto.

One of the principal ingredients in the inventive primer composition is an organosilicon compound, i.e. organosilane or organopolysiloxane compound, having, in a molecule, at least one guanidino group represented by the general formula $(R_2N)_2C=N-$. In the formula, the symbol R denotes a hydrogen atom or a monovalent hydrocarbon group selected from the class consisting of alkyl groups such as methyl, ethyl, propyl, butyl and octyl groups, alkenyl groups such as vinyl and allyl groups and aryl groups such as phenyl and tolyl groups. The monovalent hydrocarbon group should preferably have 1 to 10 carbon atoms or, more preferably, 1 to 6 carbon atoms. It is optional that two different kinds or more of these hydrocarbon groups are contained in a guanidino group or in a molecule of the organosilicon compound. The divalent group through which the guanidino group is bonded to the silicon atom in the organosilicon compound is not particularly limitative but it is preferably an alkylene group such as a propylene or trimethylene group —CH$_2$CH$_2$CH$_2$— or an oxyalkylene group.

Examples of the guanidino group-containing organosilicon compound, i.e. organosilane or organopolysiloxane compound, include those expressed by the following general formulas, in which Me is a methyl group, R has the same meaning as defined above, R$^1$ is a monovalent hydrocarbon group having 1 to 10 or, preferably, 1 to 6 carbon atoms, R$^2$ is a divalent hydrocarbon group forming a cyclic structure together with the carbon atom directly bonded to the nitrogen atom in the iminoxy group, the subscript a is 1,2 or 3, the subscripts m and n are each a positive integer in the range from 1 to 50 and the symbol G denotes a substituted-guanidino group of the formula (R$_2$N)$_2$C=N—:

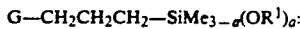

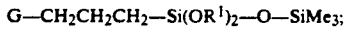

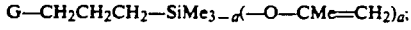

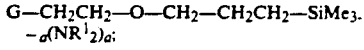

and

MeO—(—SiMe$_2$—O—)$_m$—[—SiMe(—CH$_2$—CH$_2$CH$_2$—G)—O—]$_n$—Me.

Preferably, the group denoted by R is a methyl, ethyl, propyl or phenyl group and the group denoted by R$^1$ is a methyl or ethyl group. The divalent group denoted by R$^2$ is preferably an alkylene group such as tetramethylene, pentamethylene and hexamethylene groups.

Particular examples of the guanidino group-containing organosilicon compound suitable as the component (b) in the inventive primer composition include those expressed by the following structural formulas;

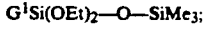

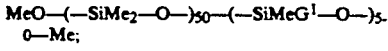

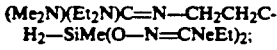

and

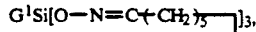

in which the symbols Me, Et, Pr and Ph denote methyl, ethyl, propyl and phenyl groups, respectively, and the symbol G$^1$ denotes a 3-(tetramethylguanidino)propyl group of the formula (Me$_2$N)$_2$C=N—CH$_2$CH$_2$CH$_2$—, and, among the above given compounds, the compound of the first-given formula, i.e. 3-(tetramethylguanidino)propyl trimethoxy silane, is the most preferable in view of the relatively simple procedure for the synthesis of the compound.

The concentration of the component (b) in the inventive primer composition is not particularly limitative and can be varied in a wide range in consideration of the convenience of working. When the concentration is too low, no sufficient priming effect can be obtained by a single coating and drying while the priming effect can no longer be increased even by increasing the concentration thereof to exceed a certain upper limit rather with an economical disadvantage. The concentration is usually in the range from 0.01 to 40% by weight or, preferably, from 0.1 to 20% by weight relative to the content of the component (b).

The component (c) as the other of the principal ingredients in the inventive primer composition is a so-called silane coupling agent exemplified by those having 2 or 3 alkoxy groups in a molecule including 3-aminopropyl trimethoxy silane, 3-mercaptopropyl trimethoxy silane, 3-methacryloxypropyl trimethoxy silane, methyl trimethoxy silane, methyl triethoxy silane, ethyl trimethoxy silane, ethyl triethoxy silane, phenyl trimethoxy silane, phenyl triethoxy silane, vinyl trimethoxy silane, vinyl triethoxy silane, vinyl tris($\beta$-methoxyethoxy) silane, 2-(3,4-epoxycyclohexyl)ethyl trimethoxy silane, 3-glycidyloxypropyl methyl dimethoxy silane, 3-glycidyloxypropyl methyl diethoxy silane, 3-glycidyloxypropyl trimethoxy silane, 3-glycidyloxypropyl triethoxy silane, 3-methacryloxypropyl triethoxy silane, N-(2-aminoethyl) 3-aminopropyl methyl dimethoxy silane, N-(2-aminoethyl) 3-aminopropyl methyl diethoxy silane, N-(2-aminoethyl) 3-aminopropyl trimethoxy silane, N-(2-aminoethyl) 3-aminopropyl triethoxy silane, N-phenyl-3-aminopropyl trimethoxy silane, N-phenyl-3-aminopropyl triethoxy silane, 3-aminopropyl triethoxy silane, 3-acryloxypropyl trimethoxy silane, 3-acryloxypropyl triethoxy silane, 3-chloropropyl trimethoxy silane, 3-chloropropyl triethoxy silane, 3-mercaptopropyl triethoxy silane and the like. Partial hydrolysis products of these silane compounds can also be used as the component (c). The amount of the silane coupling agent as the component (c) in the inventive primer composition should be in the range from 10 to 20,000% by weight or, preferably, from 100 to 10,000% by weight based on the amount of the component (b).

The primer composition of the present invention can be prepared by dissolving the above described guanidino group-containing organosilicon compound as the component (b) and the silane coupling agent as the component (c) in a suitable organic solvent as the component (a) each in a specified concentration. It is optional that the inventive primer composition is further admixed with known additives such as organic titanate ester compounds, organotin compounds, silicone resins and the like according to need.

The method of the invention for priming the surface of a substrate for adhesive bonding can be performed by coating the substrate surface with the above described primer composition followed by drying. Any conventional method for coating can be applied to this procedure including spray coating, brush coating, roller coating, dip coating and the like without particular limitations. The substrate surface coated with the primer composition is airdried to completely evaporate the organic solvent. The coating amount of the primer composition can be small insofar as a thin film of the composition is formed evenly on the surface. An excessively large coating amount is rather detrimental against the adhesive bonding of a room temperature-curable silicone rubber composition and the substrate surface. As a rough measure, the coating amount should be in the range from 10 to 100 g/m² or, preferably, from 30 to 50 g/m².

In the following, examples and comparative examples are given to illustrate the invention in more detail.

EXAMPLE 1 AND COMPARATIVE EXAMPLE 1

A primer composition, referred to as the primer A hereinbelow, was prepared, in Example 1, by dissolving, in 1000 g of acetone, 5 g of 3-(tetramethylguanidino)propyl trimethoxy silane, 40 g of 3-aminopropyl triethoxy silane, 50 g of 3-mercaptopropyl trimethoxy silane and 140 g of methyl trimethoxy silane. Another primer composition, referred to as the primer B hereinbelow, was prepared, in Comparative Example 1, in the same formulation as above excepting omission of 3-(tetramethylguanidino)propyl trimethoxy silane.

Each of the primers A and B was applied evenly by brush coating to the surface of an aluminum panel coated with a fluorocarbon resin-based paint after cleaning followed by air-drying for 1 hour. The primer-treated surface was then coated with a room temperature-curable silicone rubber composition of the deamination type curable by releasing N,N-diethyl hydroxylamine and kept standing in an open atmosphere to cure the silicone rubber composition.

After 14 days of standing, the adhesive bonding strength between the cured silicone rubber layer and the substrate surface was examined according to the procedure specified in JIS A 0578 to find that the maximum tensile stress was 6.7 kg/cm² with 100% occurrence of cohesive failure of adhesion when the primer A was used for the pre-treatment of the substrate surface while the maximum tensile stress was 3.4 kg/cm² with 100% occurrence of interfacial failure of adhesion when the primer B was used. Examples 2 to 8 and Comparative Examples 2 to 8.

Seven primer compositions, referred to as the primers C, D, E, F, G, H and I hereinbelow, were prepared in Examples 2 to 8, respectively, and seven more primer compositions, referred to as the primers J, K, L, M, N, O and P hereinbelow, were prepared in Comparative Examples 2 to 8, respectively, each by dissolving, in 1000 g of acetone, two to four kinds of the compounds I to VIII indicated below each in an amount in g given in Table 1 to follow.

The compounds I to VIII were:

I: 3-(tetramethylguanidino)propyl trimethoxy silane;
II: 3-(tetramethylguanidino)propyl methyl dimethoxy silane;
III: 3-(1,3-dimethy-1,3-diethylguanidino)propyl triacetoxy silane;
IV: 3-aminopropyl triethoxy silane;
V: 3-mercapropropyl trimethoxy silane;
VI: 3-methacryloxypropyl trimethoxy silane;
VII methyl trimethoxy silane; and
VIII: tetra(isopropoxy)titanium.

Each of the thus prepared primer compositions C to P was subjected to the test for the evaluation of the priming effect obtained therewith in just the same manner as in the preceding example except that the test panels were coated, besides the fluorocarbon resin-based paint, also with a urethane resin-based paint and an acrylic resin-based paint. The results of the measurements of the maximum tensile stress are shown in Table 2 below. Failure of adhesion always occurred at the interface between the cured silicone rubber layer and the paint-coated substrate surface when the primer treatment of the surface was performed with the primers J to P while cohesive failure of adhesion always took place when the substrate surface was treated with the primers C to I except that the failure of adhesion was cohesive in 95% and interfacial in 5% of the tests undertaken when the primer F was used on the substrate surface coated with the acrylic resin-based paint and when the primer G was used on the substrate surface coated with the fluorocarbon resin-based paint.

TABLE 1

| Primer No. | I | II | III | IV | V | VI | VII | VIII |
|---|---|---|---|---|---|---|---|---|
| C | 5 | | | | 40 | | 140 | |
| D | | | 5 | 50 | | | 130 | 20 |
| E | 10 | | | 30 | 40 | | | |
| F | 20 | | | | | 40 | 110 | |
| G | 4 | | | 65 | | 80 | 120 | |
| H | | 6 | | | 75 | 30 | 120 | |
| I | 7 | | | 40 | | 50 | | |
| J | | | | | 40 | | 140 | |
| K | | | | 50 | | | 130 | 20 |
| L | | | | 30 | 40 | | | |
| M | | | | | | 40 | 110 | |
| N | | | | 65 | | 80 | 120 | |
| O | | | | | 75 | 30 | 120 | |
| P | | | | 40 | | 50 | | |

TABLE 2

| | Maximum tensile stress, kg/cm² | | |
|---|---|---|---|
| Primer No. | Fluorocarbon resin | Urethane resin | Acrylic resin |
| C | 6.6 | 6.2 | 6.1 |
| D | 6.7 | 6.3 | 6.1 |
| E | 5.9 | 6.2 | 6.4 |
| F | 6.3 | 6.3 | 6.1 |
| G | 6.2 | 6.1 | 6.3 |
| H | 6.3 | 6.2 | 6.2 |
| I | 6.7 | 6.2 | 6.4 |
| J | 3.2 | 3.0 | 2.6 |
| K | 1.0 | 1.2 | 1.3 |
| L | 1.0 | 1.2 | 1.2 |
| M | 1.1 | 1.0 | 1.5 |
| N | 2.3 | 2.0 | 2.0 |
| O | 2.4 | 2.4 | 2.3 |
| P | 2.3 | 2.0 | 2.0 |

What is claimed is:

1. A primer composition in the form of a homogeneous solution consisting essentially of:
   (a) an organic solvent;
   (b) an organosilicon compound having, in a molecule, at least one guanidino group represented by the general formula $(R_2N)_2C=N-$, in which R denotes a hydrogen atom or a monovalent hydrocarbon group or a partial hydrolysis product thereof dissolved in the organic solvent; and (c) a silane coupling agent dissolved in the organic solvent in an amount in the range from 10 to 20,000% by weight based on the amount of the component (b).

2. The primer composition as claimed in claim 1 in which the organosilicon compound as the component (b) is selected from the group consisting of the compounds represented by the general formulas:

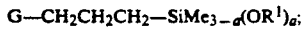

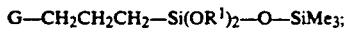

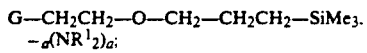

and

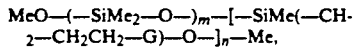

in which Me is a methyl group, R has the same meaning as defined above, $R^1$ is a monovalent hydrocarbon group having 1 to 10 carbon atoms, $R^2$ is a divalent hydrocarbon group forming a cyclic structure together with the carbon atom directly bonded to the nitrogen atom in the iminoxy group, the subscript a is 1, 2 or 3, the subscripts m and n are each a positive integer in the range from 1 to 50 and the symbol G denotes a guanidino group of the formula $(R_2N)_2C=N-$, and partial hydrolysis productd thereof.

3. The primer composition as claimed in claim 1 in which the silane coupling agent as the component (c) is selected from the group consisting of 3-aminopropyl trimethoxy silane, 3-mercaptopropyl trimethoxy silane, 3-methacryloxypropyl trimethoxy silane, methyl trimethoxy silane, methyl triethoxy silane, ethyl trimethoxy silane, ethyl triethoxy silane, phenyl trimethoxy silane, phenyl triethoxy silane, vinyl trimethoxy silane, vinyl triethoxy silane, vinyl tris($\beta$-methoxyethoxy) silane, 2-(3,4-epoxycyclohexyl)ethyl trimethoxy silane, 3-glycidyloxypropyl methyl dimethoxy silane, 3-glycidyloxypropyl methyl diethoxy silane, 3-glycidyloxypropyl trimethoxy silane, 3-glycidyloxypropyl triethoxy silane, 3-methacryloxypropyl triethoxy silane, N-(2-aminoethyl) 3-aminopropyl methyl dimethoxy silane, N-(2-aminoethyl) 3-aminopropyl methyl diethoxy silane, N-(2-aminoethyl) 3-aminopropyl trimethoxy silane, N-(2-aminoethyl) 3-aminopropyl triethoxy silane, N-phenyl-3-aminopropyl trimethoxy silane, N-phenyl-3-aminopropyl triethoxy silane, 3-aminopropyl triethoxy silane, 3-acryloxypropyl trimethoxy silane, 3-acryloxypropyl triethoxy silane, 3-chloropropyl trimethoxy silane, 3-chloropropyl triethoxy silane, 3-mercaptopropyl triethoxy silane and partial hydrolysis products thereof.

4. A method for improving the adhesive bonding between a substrate surface and a room temperature-curable silicone rubber composition cured on the substrate surface which comprises, prior to contacting of the substrate surface with the room temperature-curable silicone rubber composition, the steps of:

(A) coating the substrate surface with a primer composition consisting essentially of (a) an organic solvent;

(b) an organosilicon compound having, in a molecule, at least one guanidino group represented by the general formula

in which R denotes a hydrogen atom or a monovalent hydrocarbon group or a partial hydrolysis product thereof dissolved in the organic solvent, and (c) a silane coupling agentdissolved in the organic solvent in an amount in the range from 10 to 20,000% by weight based on the amount of the component (b); and (B) drying the substrate surface coated with the primer composition by evaporating the organic solvent.

* * * * *